(12) United States Patent
Toyota et al.

(10) Patent No.: US 8,446,054 B2
(45) Date of Patent: May 21, 2013

(54) PERIODIC MAGNETIC FIELD GENERATION DEVICE, AND LINEAR MOTOR AND ROTARY MOTOR USING THE SAME

(75) Inventors: Akihito Toyota, Kitakyushu (JP); Toru Shikayama, Kitakyushu (JP); Masanobu Kakihara, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 339 days.

(21) Appl. No.: 12/835,692

(22) Filed: Jul. 13, 2010

(65) Prior Publication Data

US 2011/0012440 A1    Jan. 20, 2011

(30) Foreign Application Priority Data

Jul. 17, 2009    (JP) .................................. 2009-169227

(51) Int. Cl.
H02K 41/02    (2006.01)
H02K 21/00    (2006.01)

(52) U.S. Cl.
USPC ............... 310/12.24; 310/12.26; 310/154.28; 310/156.43; 310/156.45; 335/306

(58) Field of Classification Search
USPC .............. 310/12.24, 156.38, 156.43, 156.44, 310/156.45, 156.48, 12.25–12.26, 154.21–154.22, 154.28–154.29, 154.46–154.48; 335/306

See application file for complete search history.

(56) References Cited

U.S. PATENT DOCUMENTS

| | | | | |
|---|---|---|---|---|
| 4,731,598 | A * | 3/1988 | Clarke | 335/210 |
| 5,019,863 | A * | 5/1991 | Quimby | 335/210 |
| 5,107,238 | A * | 4/1992 | Leupold | 335/306 |
| 5,128,575 | A * | 7/1992 | Heidelberg et al. | 310/156.41 |
| 5,280,209 | A * | 1/1994 | Leupold et al. | 310/156.41 |
| 6,104,108 | A * | 8/2000 | Hazelton et al. | 310/12.06 |
| 6,384,504 | B1 * | 5/2002 | Ehrhart et al. | 310/156.55 |
| 6,841,910 | B2 * | 1/2005 | Gery | 310/103 |
| 6,879,075 | B2 * | 4/2005 | Calfo et al. | 310/156.01 |

(Continued)

FOREIGN PATENT DOCUMENTS

| | | |
|---|---|---|
| JP | 2007-006545 | 1/2007 |
| JP | 2007-019127 | * 2/2007 |
| JP | 2007-110822 | 4/2007 |
| JP | 2007-312449 | * 11/2007 |

OTHER PUBLICATIONS

Machine Translation of Ishibashi, JP 2007-312449, Nov. 2007.*
Machine Translation of Ishibashi, JP 2007-019127, Feb. 2007.*

*Primary Examiner* — Burton Mullins
(74) *Attorney, Agent, or Firm* — Ditthavong Mori & Steiner, P.C.

(57) ABSTRACT

A periodic magnetic field generation device is provided with a field pole of a Halbach array structure in which main pole permanent magnets magnetized in a direction of a generated field and sub pole permanent magnets magnetized in a direction opposite to the direction of magnetic poles of the main pole permanent magnets are alternately disposed linearly or circularly so as to be adjacent to each other. A part of each of the main pole permanent magnets on a side on which the magnetic field is generated is replaced by a soft magnetic member, and a relation between a length A of the soft magnetic member on the side of the generated field along a moving direction and a length B of each main pole permanent magnet on a side of a back yoke along the moving direction is A<B.

11 Claims, 5 Drawing Sheets

U.S. PATENT DOCUMENTS

| | | | |
|---|---|---|---|
| 6,979,917 B2 * | 12/2005 | Ehrhart | 310/11 |
| 7,053,508 B2 * | 5/2006 | Kusase et al. | 310/64 |
| 7,859,141 B2 * | 12/2010 | Sadarangani et al. | 310/12.24 |
| 2010/0181858 A1 * | 7/2010 | Hibbs et al. | 310/156.07 |
| 2011/0057533 A1 * | 3/2011 | Murakami et al. | 310/156.43 |

* cited by examiner

PERIODIC MAGNETIC FIELD GENERATION DEVICE, AND LINEAR MOTOR AND ROTARY MOTOR USING THE SAME

CROSS-REFERENCE TO RELATED APPLICATION

The present application claims priority to under 35 U.S.C. §119 Japanese Patent Application No. 2009-169227, filed on Jul. 17, 2009. The contents of these applications are incorporated herein by reference in their entirety.

BACKGROUND OF THE INVENTION

1. Field of the Invention

The present invention relates to a periodic magnetic field generation device, and a linear motor and a rotary motor using the same.

2. Description of the Related Art

Conventionally, as periodic magnetic field generation device used for a linear motor or a rotary motor and having a field pole configured by permanent magnets of a Halbach magnet structure, as disclosed in Japanese Unexamined Patent Application Publican No. 2007-006545 published on Jan. 11, 2007, for example, there is proposed a periodic magnetic field generation device having a structure of a Halbach magnet array provided with main pole permanent magnets magnetized in a direction of a generated field and sub pole permanent magnets magnetized in a direction opposite to the magnetic pole of the main pole permanent magnets, and in which a part of each of the main pole permanent magnets on a side on which a magnetic field is generated is replaced with a soft magnetic member.

By replacing a part of each main pole permanent magnet on the side on which the magnetic field is generated with a soft magnetic member, a periodic magnetic field generation device having such a structure is capable of alleviating an influence of magnetic saturation in a magnetic circuit in comparison with a periodic magnetic field generation device that is configured only by a Halbach magnet array, thereby increasing the generated field.

However, a periodic magnetic field generation device having a field pole configured by conventional permanent magnets of a Halbach magnet structure poses a problem that, as saturation magnetic flux density of the soft magnetic member itself is limited and as the magnetic flux density in the magnetic circuit increases due to an improvement in properties of recent permanent magnets, the generated field of the periodic magnetic field generation device is limited due to the magnetic saturation in the magnetic circuit.

Further, a linear motor or a rotary motor using the periodic magnetic field generation device also poses a problem that it is not possible to increase a thrust force or a torque as the generated field of periodic magnetic field generation device cannot be increased.

Moreover, although a Halbach magnet array used in the periodic magnetic field generation device can cause the generated field to show a sinusoidal wave distribution due to its structure, further sinusoidalization of the generated field is limited, and there is still much to be improved in order to improve a thrust force and reduce a thrust ripple of the linear motor and such.

The present invention is conceived of in order to address the above problems, and the present invention aims to provide a periodic magnetic field generation device whose generated field is further increased and sinusoidalized by changing a shape of a soft magnetic member or shapes of main pole permanent magnets and sub pole permanent magnets in a periodic magnetic field generation device having a Halbach magnet array. The present invention also aims to provide a linear motor and a rotary motor using such a periodic magnetic field generation device.

SUMMARY OF THE INVENTION

A first aspect according to the present invention is a periodic magnetic field generation device provided with: a field pole of a Halbach array structure in which main pole permanent magnets magnetized in a direction of a generated field and sub pole permanent magnets magnetized in a direction opposite to the direction of magnetic poles of the main pole permanent magnets are alternately disposed linearly or circularly so as to be adjacent to each other, wherein a part of each of the main pole permanent magnets on a side on which the magnetic field is generated is replaced by a soft magnetic member, and a relation A<B is established when a length of the soft magnetic member on the side of the generated field along a moving direction of the field is A, and a length of each main pole permanent magnet on a side of a back yoke along the moving direction of the field is B.

According to the present invention, a periodic magnetic field generation device is provided with a Halbach array structure in which main pole permanent magnets magnetized in a direction of a generated field and sub pole permanent magnets magnetized in a direction opposite to the direction of magnetic poles of the main pole permanent magnets are alternately disposed linearly or circularly so as to be adjacent to each other. A part of each of the main pole permanent magnets on a side on which the magnetic field is generated is replaced by a soft magnetic member, and a relation A<B is established when a length of the soft magnetic member on the side of the generated field is A and a length of each main pole permanent magnet on a side of a back yoke is B. Thus, the present invention presents an advantageous effect of providing a periodic magnetic field generation device whose generated field is increased and sinusoidalized by making a surface of a soft magnetic member on a side of a generated field narrower than that of the conventional example.

BRIEF DESCRIPTION OF THE DRAWINGS

The present invention will be described in further detail with reference to the accompanying drawings wherein.

DETAILED DESCRIPTION OF THE EMBODIMENTS

The following describes embodiments according to the present invention with reference to the drawings.

Embodiment 1

Figure 1:
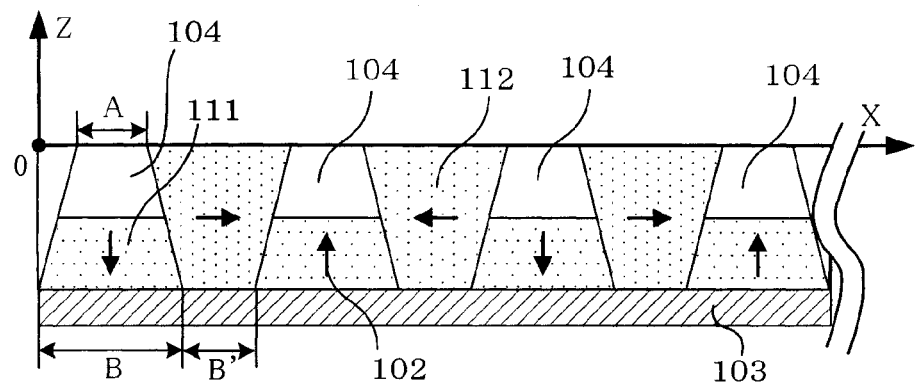
FIG. 1 is a cross-sectional view of a periodic magnetic field generation device showing a first embodiment according to the present invention.

FIG. 1 is a cross-sectional view of a periodic magnetic field generation device showing a first embodiment according to the present invention.

Referring to FIG. 1, the periodic magnetic field generation device is provided with a back yoke 103, main pole permanent magnets 111 whose magnetization directions are upward (↑) and downward (↓), sub pole permanent magnets 112 whose magnetization directions are rightward (→) and leftward (←), and soft magnetic members 104 respectively disposed by a side of the main pole permanent magnets 111 on which a magnetic field is generated.

Here, references A and B in FIG. 1 respectively represent a length of each soft magnetic member 104 on a side of the generated field and a length of each main pole permanent magnet 111 on a side of the back yoke 103, and, for example, the length A of each soft magnetic member 104 on the side of the generated field is as long as a length B' of each sub pole permanent magnet 112 on the side of the back yoke 103. Here, a total length of the length A of each soft magnetic member 104 on the side of the generated field and the length B of each main pole permanent magnet 111 on the side of the back yoke 103 is 30 mm.

The first embodiment according to the present invention is characterized in that the soft magnetic members 104 and the main pole permanent magnets 111 are formed in a trapezoidal shape such that, where a length of each soft magnetic member 104 on the side of the generated field along a moving direction of the field is A and a length of each main pole permanent magnet 111 on the side of the back yoke 103 along the moving direction of the field is B, and a relation of A<B is established.

Figure 4A:
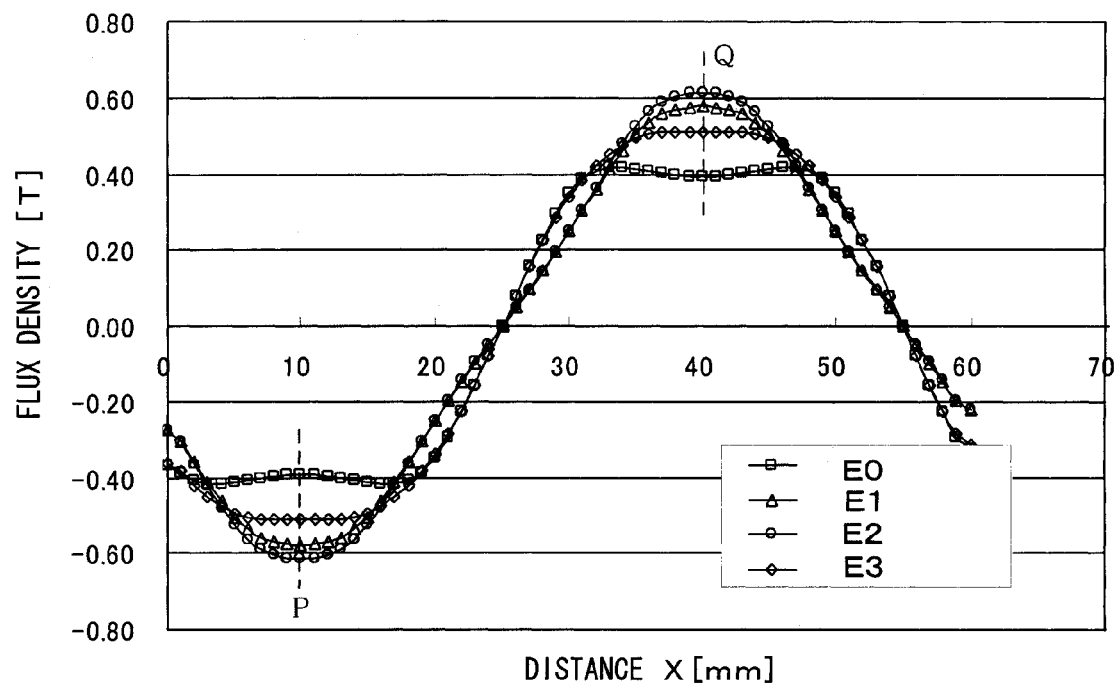
FIG. 4A is a chart comparing properties of the periodic magnetic field generation devices of the embodiments according to the present invention and a comparison example, showing a gap magnetic flux density distribution at a point where Z=5 mm of each device.
Figure 4B:
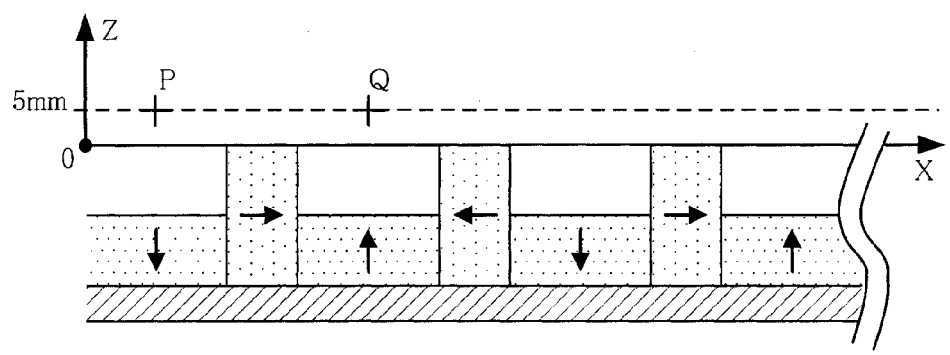
FIG. 4B is a diagram showing the point where Z=5 mm in a waveform of the gap magnetic flux density distribution shown in FIG. 4A.

FIG. 4A is a chart comparing properties of the periodic magnetic field generation devices of the embodiments according to the present invention and a comparison example, showing a gap magnetic flux density distribution at a point where Z=5 mm of each device. FIG. 4B is a diagram showing the point where Z=5 mm in a waveform of the gap magnetic flux density distribution shown in FIG. 4A. Specifically, the chart of FIG. 4A shows the magnetic flux density distribution at a position of dotted line (Z=5 mm) in FIG. 4B. In the drawings, a line E1 represents the magnetic flux density distribution of the first embodiment, a line E2 represents the magnetic flux density distribution of a second embodiment, a line E3 represents the magnetic flux density distribution of a third embodiment, and a line E0 represents the magnetic flux density distribution of a comparison example. Here, while the relation between the length A of a soft magnetic member on the side of the generated field along the moving direction of the field and the length B of a main pole permanent magnet on the side of the back yoke along the moving direction of the field is A<B in any of the embodiments of the present invention, the relation in the comparison example is A=B.

The chart for the first embodiment (E1) in FIG. 4A (shown by the line connecting blank triangles) shows an example taking the length A of each soft magnetic member 104 on the side of the generated field to be 10 mm and the length B of each main pole permanent magnet 111 on the side of the back yoke 103 to be 20 mm.

Here, when comparing the magnetic flux density generated by the periodic magnetic field generation device according to this embodiment with the magnetic flux density of periodic magnetic field generation device according to the comparison example, while the magnetic flux density generated by the periodic magnetic field generation device according to the comparison example is 0.4 T at positions P and Q each at a center of a main pole magnet, the magnetic flux density generated by the periodic magnetic field generation device of the first embodiment according to the present invention is increased up to 0.58 T. Thus, it can be seen that the present invention is more effective than the comparison example.

With this, according to the present invention, it is possible to provided a periodic magnetic field generation device with an increased generated field by forming the soft magnetic members 104 and the main pole permanent magnets 111 in a trapezoidal shape such that the length of each soft magnetic member 104 on the side of the generated field becomes A and the length of each main pole permanent magnet 111 on the side of the back yoke 103 becomes B, and the relation A<B is established, so as to reduce a surface of the soft magnetic members 104 on the side of generated field as compared to the comparison example.

Figure 5:
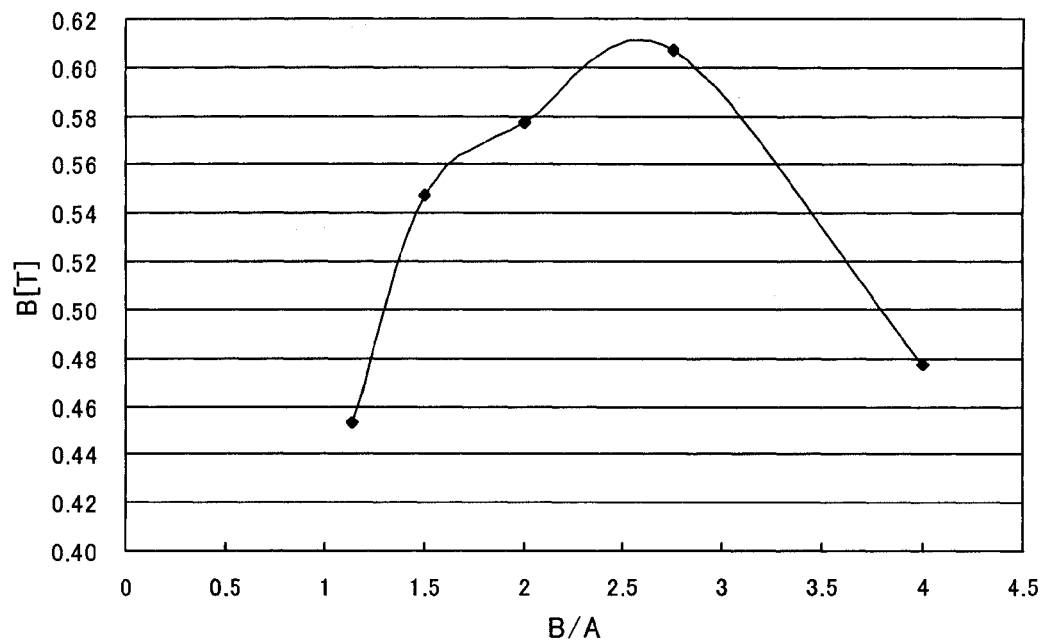
FIG. 5 is a chart showing a gap magnetic flux density maximum value distribution with respect to B/A at the point where Z=5 mm of the periodic magnetic field generation device of the first embodiment according to the present invention.

FIG. 5 is a chart showing a gap magnetic flux density maximum value distribution with respect to B/A at the point where Z=5 mm of the periodic magnetic field generation device of the first embodiment according to the present invention. In the figure, an abscissa axis shows ratios between the length B of the main pole permanent magnets 111 on the side of the back yoke 103 and the length A of the soft magnetic members 104 on the side of the generated field, and an ordinate axis shows values of the magnetic flux density.

As shown in FIG. 5, with the periodic magnetic field generation device of the first embodiment according to the present invention, it can be seen that the gap magnetic flux density shows its maximum value near B/A=2.6, and the gap magnetic flux density rapidly decreases its value when it becomes B/A=1.5 or below. Accordingly, a lower limit of B/A is set to be 1.5, and its upper limit is set to be 3.5 at which the gap magnetic flux density shows the same value as that at the lower limit of 1.5. With this, by configuring the periodic magnetic field generation device of the first embodiment according to the present invention within a range of $1.5 \leq B/A \leq 3.5$, it is possible to provide a periodic magnetic field generation device with an increased generated field.

Figure 8:
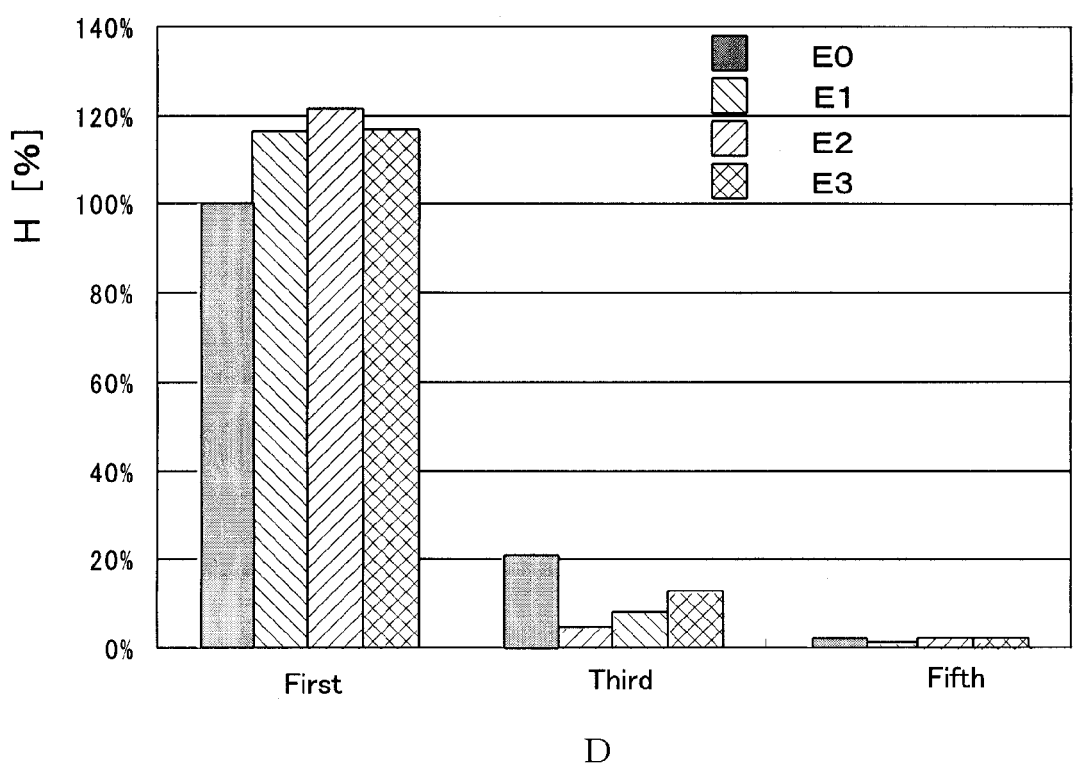
FIG. 8 is a chart comparing results of harmonic analysis of the waveforms of the gap magnetic flux density distribution at the point where Z=5 mm of the periodic magnetic field generation devices of the embodiments according to the present invention and the comparison (conventional) example.

FIG. 8 is a chart comparing results of harmonic analysis of the waveforms of the gap magnetic flux density distribution at the point where Z=5 mm of the periodic magnetic field generation devices of the embodiments according to the present invention and the comparison example. In the figure, a bar E1 represents the result of harmonic analysis in the first embodiment, a bar E2 represents the result of harmonic analysis in the second embodiment, a bar E3 represents the result of harmonic analysis in the third embodiment, and a bar E0 represents the result of harmonic analysis in the comparison example. In the figure, an abscissa axis shows orders D in the harmonic analysis, and an ordinate axis shows proportions H (%) of harmonic components in the waveforms of the magnetic flux density, and showing an example in which the length A of the soft magnetic members 104 on the side of the generated field is 10 mm and the length B of the main pole permanent magnets 111 on the side of the back yoke 103 is 20 mm.

As shown in FIG. 8, with the periodic magnetic field generation device of the first embodiment according to the present invention, it is possible to increase the components in a first order, and decrease the components in a third order and a fifth order to be smaller than that in the comparison example. Thus, it is possible to provide a periodic magnetic field generation device with an increased generated field and sinusoidalized as compared to the comparison example.

Embodiment 2

Next, the second embodiment according to the present invention is described.

Figure 2:
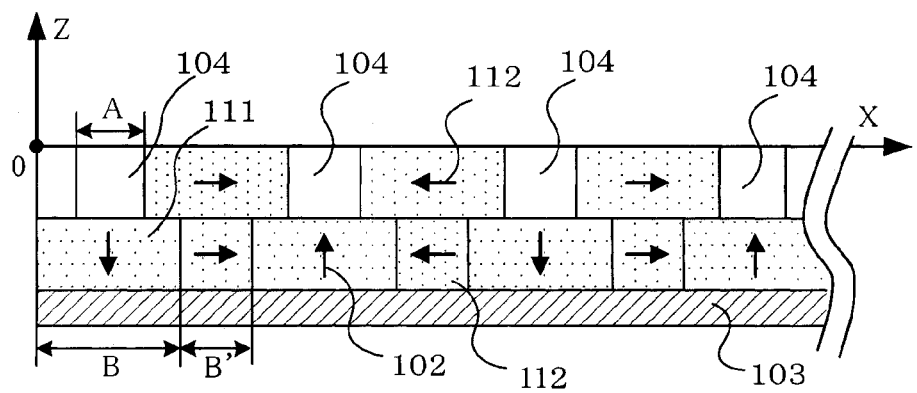
FIG. 2 is a cross-sectional view of a periodic magnetic field generation device showing a second embodiment according to the present invention.

FIG. 2 is a cross-sectional view of a periodic magnetic field generation device showing a second embodiment according to the present invention.

Referring to FIG. 2, the periodic magnetic field generation device is provided with the back yoke 103, the main pole permanent magnets 111 whose magnetization directions are upward (↑) and downward (↓), the sub pole permanent magnets 112 whose magnetization directions are rightward (→) and leftward (←), and the soft magnetic members 104 respectively disposed by the side of the main pole permanent magnets 111 on which the magnetic field is generated.

In the figure, the references A and B respectively represent the length of each soft magnetic member 104 on the side of the generated field and the length of each main pole permanent magnet 111 on the side of the back yoke 103, and, for example, the length A of each soft magnetic member 104 on the side of the generated field is as long as the length B' of each sub pole permanent magnet 112 on the side of the back yoke 103. Here, a total length of the length A of each soft magnetic member 104 on the side of the generated field and the length B of each main pole permanent magnet 111 on the side of the back yoke 103 is 30 mm.

The second embodiment according to the present invention is different from the first embodiment in that the soft magnetic members 104 and the main pole permanent magnets 111 are formed in a shape such that, where a length of each soft magnetic member 104 on the side of the generated field along the moving direction is A and a length of each main pole permanent magnet 111 on the side of the back yoke 103 along the moving direction is B, a relation of A<B is established, and the length of each soft magnetic member 104 on the side of the back yoke 103 along the moving direction is made different from the length of each main pole permanent magnet 111 on the side of the generated field along the moving direction. Specifically, the second embodiment is characterized in that the length A of each soft magnetic member 104 on the side of the generated field along the moving direction is identical with the length of each soft magnetic member 104 on the side of the back yoke 103 along the moving direction, and the length of each main pole permanent magnet 111 on the side of the generated field along the moving direction is identical with the length B of each main pole permanent magnet 111 on the side of the back yoke 103 along the moving direction.

Here, as shown in FIG. 4A in which the properties of each periodic magnetic field generation device of the corresponding embodiment according to the present invention and of the periodic magnetic field generation device according to the comparison example are compared, the chart for the second embodiment (E2) in FIG. 4A (shown by the line connecting blank circles) shows an example taking the length A of each soft magnetic member 104 on the side of the generated field to be 10 mm and the length B of each main pole permanent magnet 111 on the side of the back yoke 103 to be 20 mm.

As shown in FIG. 4A, while the magnetic flux density generated by the periodic magnetic field generation device according to the comparison example is 0.4 T at the positions P and Q each set at a center of a main pole magnet, the magnetic flux density generated by the periodic magnetic field generation device of the second embodiment according to the present invention is increased up to 0.6 T. Thus, it can be seen that the present invention is effective.

With this, it is possible to provided a periodic magnetic field generation device with an increased generated field by forming the soft magnetic members 104 and the main pole permanent magnets 111 respectively such that the length of each soft magnetic member 104 on the side of the generated field becomes A and the length of each main pole permanent magnet 111 on the side of the back yoke 103 becomes B, and the relation A<B is established, as well as such that the sub pole permanent magnets 112 include two types of magnets of different widths having the same thickness as those of the main pole permanent magnets 111 and the soft magnetic members 104, respectively, so as to reduce the surface of the soft magnetic members 104 on the side of generated field as compared to the comparison example.

Figure 6:
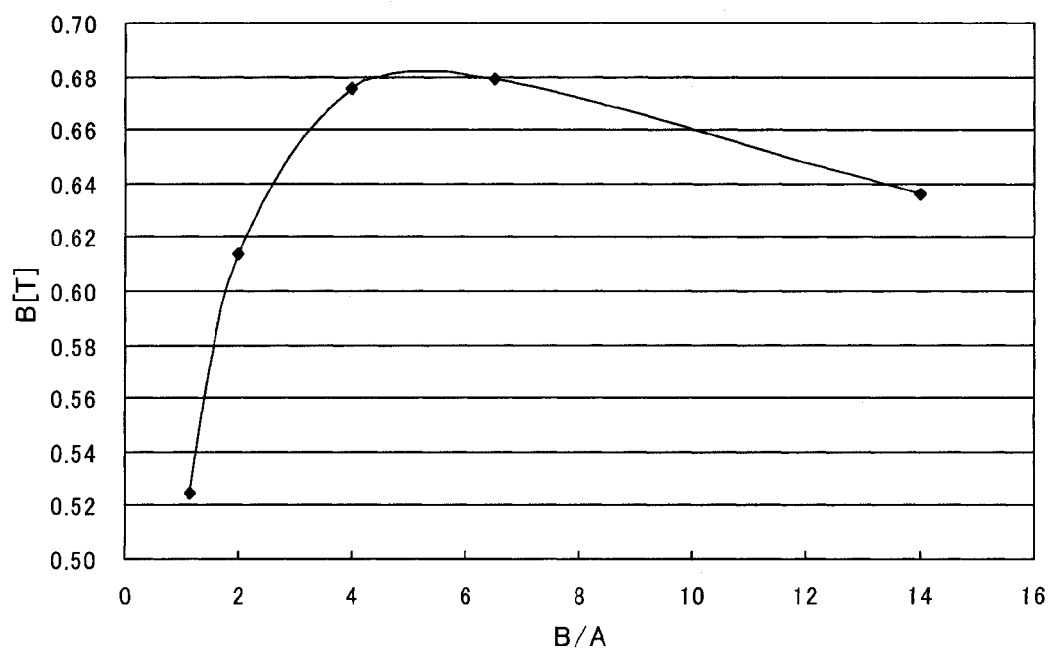
FIG. 6 is a chart showing a gap magnetic flux density maximum value distribution with respect to B/A at the point where Z=5 mm of the periodic magnetic field generation device of the second embodiment according to the present invention.

FIG. 6 is a chart showing a gap magnetic flux density maximum value distribution with respect to B/A at the point where Z=5 mm of the periodic magnetic field generation device of the second embodiment according to the present invention. In the figure, an abscissa axis shows ratios between the length B of the main pole permanent magnets 111 on the side of the back yoke 103 and the length A of the soft magnetic members 104 on the side of the generated field, and an ordinate axis shows values of the magnetic flux density.

As shown in FIG. 6, with the periodic magnetic field generation device of the second embodiment according to the present invention, it can be seen that the gap magnetic flux density shows its maximum value near B/A=5.2, and the gap magnetic flux density rapidly decreases its value when it becomes B/A=2 or below. With this, by configuring the periodic magnetic field generation device of the second embodiment according to the present invention within a range of 2≦B/A, it is possible to provide a periodic magnetic field generation device with an increased generated field.

Here, when comparing the results of the harmonic analysis of the waveforms of the gap magnetic flux density distribution at the point where Z=5 mm of the periodic magnetic field generation devices of the embodiments according to the present invention with that of the comparison example with reference to FIG. 8, with the periodic magnetic field generation device of the second embodiment according to the present invention (where the length A of each soft magnetic member 104 on the side of the generated field is 10 mm, and the length B of each main pole permanent magnet 111 on the side of the back yoke 103 is 20 mm), it is possible to increase the components in a first order, and decrease the components in a third order and a fifth order to be smaller than that in the comparison example. Thus, it is possible to provide a periodic magnetic field generation device with an increased generated field and sinusoidalized as compared to the comparison example.

Embodiment 3

Next, the third embodiment according to the present invention is described.

Figure 3:
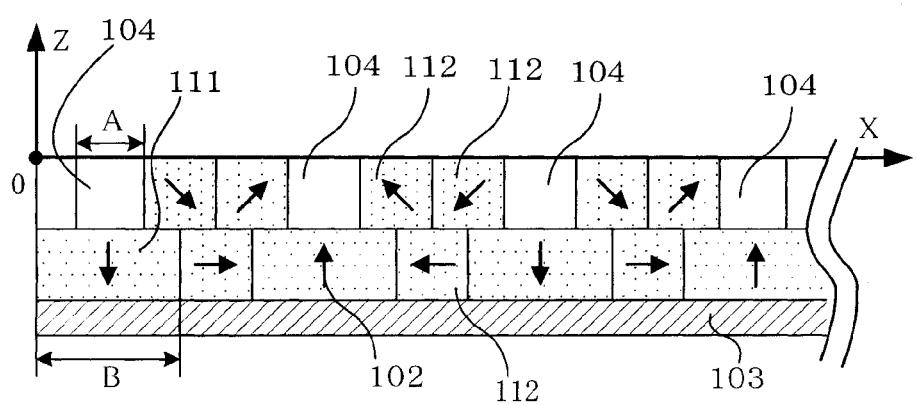
FIG. 3 is a cross-sectional view of a periodic magnetic field generation device showing a third embodiment according to the present invention.

FIG. 3 is a cross-sectional view of a periodic magnetic field generation device showing a third embodiment according to the present invention.

Referring to FIG. 3, a reference number 102 represents a direction of magnetization. The direction of the generated field is upside, and the reference number 111 whose direction of the magnetization is upward (↑) or downward (↓) represents a main pole permanent magnet, the reference number 112 whose direction of the magnetization is represented by a rightward (→), leftward (←), or oblique arrow represents a sub pole permanent magnet, the reference number 103 represents a back yoke, the reference number 104 represents a soft magnetic member disposed by the side of the main pole permanent magnet 111 on which the magnetic field is generated.

In the figure, the references A and B respectively represent the length of each soft magnetic member 104 on the side of the generated field and the length of each main pole permanent magnet 111 on the side of the back yoke 103, and, for example, the length A of each soft magnetic member 104 on the side of the generated field is as long as the length of each sub pole permanent magnet 112 on the side of the back yoke 103. Here, a total length of the length A of each soft magnetic member 104 on the side of the generated field and the length B of each main pole permanent magnet 111 on the side of the back yoke 103 is 30 mm.

The third embodiment according to the present invention is different from the second embodiment in that the soft magnetic members 104 and the main pole permanent magnets 111 are formed in a shape such that, where a length of each soft magnetic member 104 on the side of the generated field is A and a length of each main pole permanent magnet 111 on the side of the back yoke 103 is B, a relation of A<B is established, and each of the sub pole permanent magnets 112 that are adjacent to the main pole permanent magnets 111 in the second embodiment is divided into two parts on the side of the generated field, and thus configured by two permanent magnets magnetized in an oblique direction (45 degrees) and a single permanent magnet on the side of the back yoke 103.

Here, as shown in FIG. 4 in which the properties of each periodic magnetic field generation device of the corresponding embodiment according to the present invention and of the periodic magnetic field generation device according to the comparison example are compared, the chart for the third embodiment (E3) in FIG. 4A (shown by the line connecting blank diamonds) shows an example taking the length A of each soft magnetic member 104 on the side of the generated field to be 10 mm and the length B of each main pole permanent magnet 111 on the side of the back yoke 103 to be 20 mm.

As shown in FIG. 4A, while the magnetic flux density generated by the periodic magnetic field generation device according to the comparison example is 0.4 T at the positions P and Q each set at a center of a main pole magnet, the magnetic flux density generated by the periodic magnetic field generation device of the third embodiment according to the present invention is increased up to 0.5 T. Thus, it can be seen that the present invention is effective.

With this, it is possible to provide a periodic magnetic field generation device with an increased generated field by forming the soft magnetic members 104 and the main pole permanent magnets 111 respectively such that the length of each soft magnetic member 104 on the side of the generated field becomes A and the length of each main pole permanent magnet 111 on the side of the back yoke 103 becomes B, and the relation A<B is established, and each sub pole permanent magnet 112 on the side of the generated field in the second embodiment is divided into two parts and magnetized in the oblique direction, thereby configuring each sub pole permanent magnet 112 by three permanent magnets, so as to reduce the surface of the soft magnetic members 104 on the side of generated field as compared to the comparison example.

Figure 7:
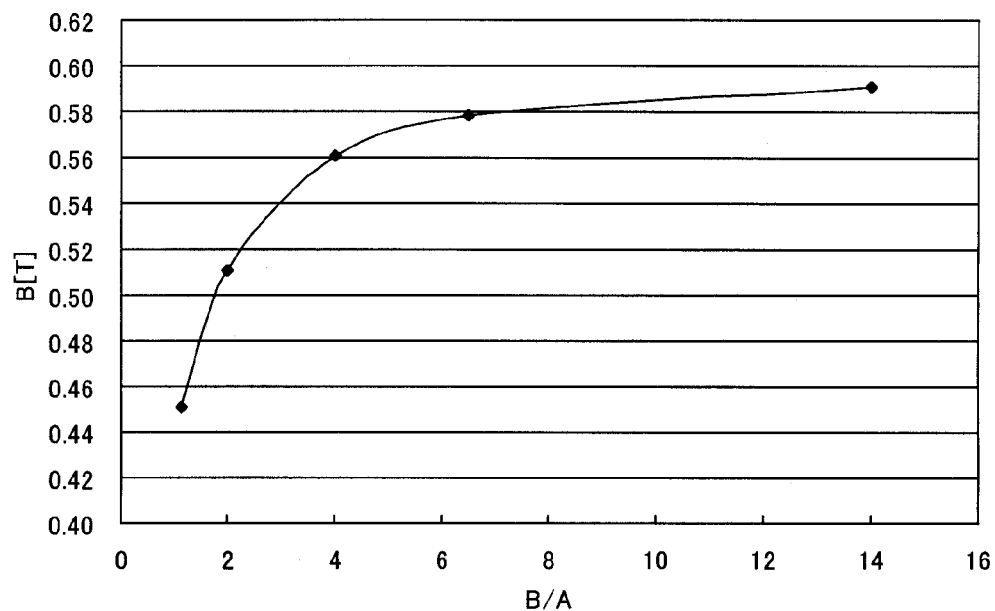
FIG. 7 is a chart showing a gap magnetic flux density maximum value distribution with respect to B/A at the point where Z=5 mm of the periodic magnetic field generation device of the third embodiment according to the present invention.

FIG. 7 is a chart showing a gap magnetic flux density maximum value distribution with respect to B/A at the point where Z=5 mm of the periodic magnetic field generation device of the third embodiment according to the present invention. In the figure, an abscissa axis shows ratios between the length B of the main pole permanent magnets 111 on the side of the back yoke 103 and the length A of the soft magnetic members 104 on the side of the generated field, and an ordinate axis shows values of the magnetic flux density.

As shown in FIG. 7, with the periodic magnetic field generation device of the third embodiment according to the present invention, it can be seen that the gap magnetic flux density rapidly decreases its value when it becomes B/A=2 or below. With this, by configuring the periodic magnetic field generation device of the third embodiment according to the present invention within a range of 2≦B/A, it is possible to provide a periodic magnetic field generation device with an increased generated field.

Here, as shown in FIG. 8 that compares the results of the harmonic analysis of the waveforms of the gap magnetic flux density distribution at the point where Z=5 mm of the periodic magnetic field generation devices of the embodiments according to the present invention with that of the comparison example, with the periodic magnetic field generation device of the third embodiment according to the present invention (where the length A of each soft magnetic member 104 on the side of the generated field is 10 mm, and the length B of each main pole permanent magnet 111 on the side of the back yoke 103 is 20 mm), it is possible to increase the components in a first order, and decrease the components in a third order and a fifth order to be smaller than that in the comparison example. Thus, it is possible to provide a periodic magnetic field generation device with an increased generated field and sinusoidalized as compared to the comparison example.

Embodiment 4

Next, the fourth embodiment according to the present invention is described.

Figure 9:
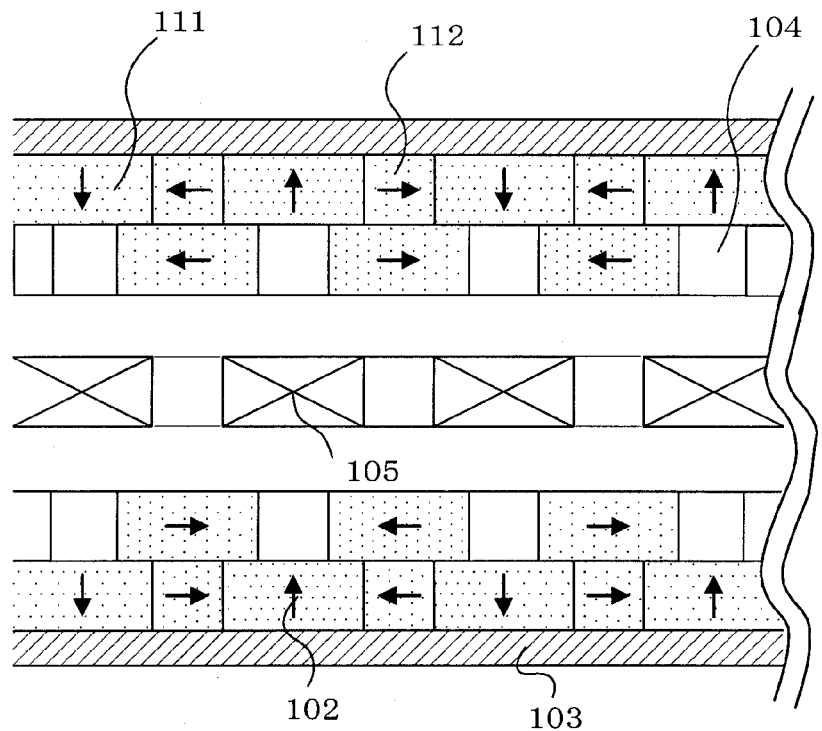
FIG. 9 is a cross-sectional view of a linear motor showing a fourth embodiment according to the present invention.

FIG. 9 is a cross-sectional view of a linear motor showing a fourth embodiment according to the present invention.

The linear motor is configured by disposing the periodic magnetic field generation devices according to the present invention (FIG. 2) such that their generated fields face toward each other, and disposing coils 105 therebetween. With such a configuration, due to an attractive force and a repulsive force between a field generated in the coils 105 by conducting the coils 105 and the fields generated by the periodic magnetic field generation devices, it is possible to linearly move the periodic magnetic field generation devices that are movers when the coils 105 are stators, and the coils 105 that are movers when the periodic magnetic field generation device are stators.

According to the fourth embodiment of the present invention, compared to the comparison example, as the magnetic flux density generated by the periodic magnetic field generation device employing the second embodiment according to the present invention is increased by 50% (0.4 T→0.6 T), a thrust force of the linear motor increases substantially in proportion to the increase of the generated field of periodic magnetic field generation device. Thus, the present invention is effective.

It should be appreciated that the configuration of the linear motor illustrated in FIG. 9 is a mere example, and it is possible to obtain the same effect using any of the periodic magnetic field generation devices according to the present invention (the first to the third embodiments). Further, the present invention is effective to any kind of structures of the linear motors, and not limited to a particular structure of the linear motors.

Embodiment 5

Next, the fifth embodiment according to the present invention is described.

Figure 10:
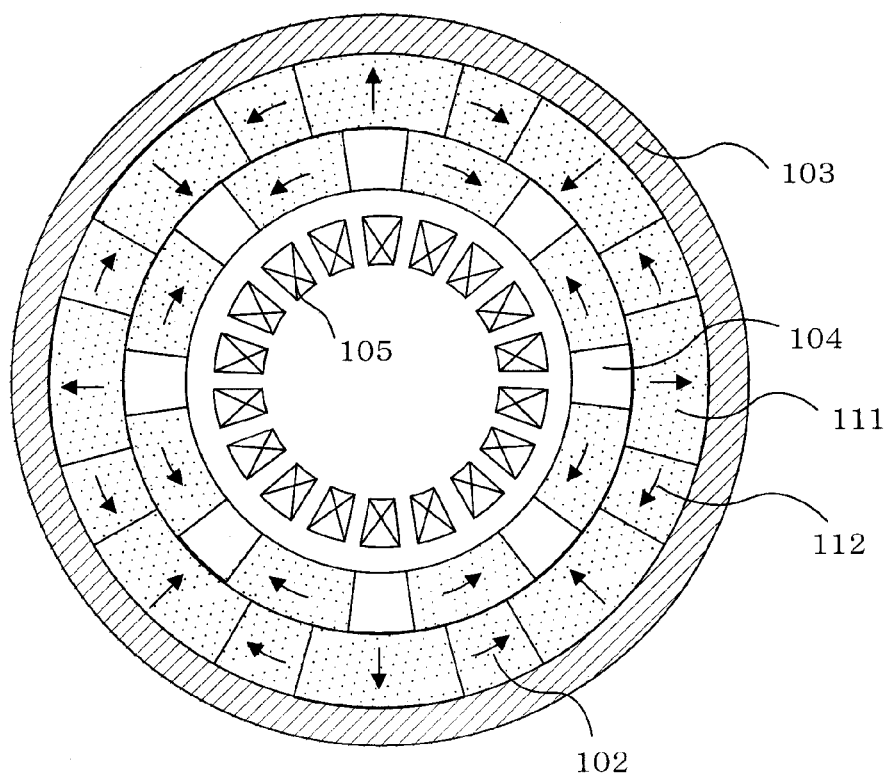
FIG. 10 is a cross-sectional view of a rotary motor showing a fifth embodiment according to the present invention.

FIG. 10 is a cross-sectional view of a rotary motor showing a fifth embodiment according to the present invention.

Referring to FIG. 10, the rotary motor is configured by disposing the periodic magnetic field generation device according to the present invention (FIG. 2) such that its direction of field generation is inside a circle, and disposing the coils 105 therein. With such a configuration, due to an attractive force and a repulsive force between a field generated in the coils 105 by conducting the coils 105, it is possible to rotate the periodic magnetic field generation device that is a rotor when the coils 105 are stators, and the coils 105 that are rotors when the periodic magnetic field generation device is a stator.

In the rotary motor, the lengths A and B are not defined as the length of each soft magnetic member 104 on the side of the generated field and the length of each main pole permanent magnet 111 on the side of the back yoke 103 as described in the first to the third embodiments, but are defined as a central angle with respect to the length of each soft magnetic member 104 on the side of the generated field and a central angle with respect to the length of each main pole permanent magnet 111 on the side of the back yoke 103.

According to the fifth embodiment of the present invention, compared to the comparison example, as the magnetic flux density generated by the periodic magnetic field generation device employing the third embodiment according to the present invention is increased by 50% (0.4 T→0.6 T), a torque of the rotary motor increases substantially in proportion to the increase of the generated field of periodic magnetic field generation device. Thus, the present invention is effective.

It should be appreciated that the configuration of the rotary motor illustrated in FIG. 10 is a mere example, and it is possible to obtain the same effect using any of the periodic magnetic field generation devices according to the present invention (the first to the third embodiments). Further, the present invention is effective to any kind of structures of the rotary motors, and not limited to a particular structure of the rotary motors.

Although the description has been given taking the examples using the linear motor and the rotary motor, the present invention is not limited by the shape of the magnetic circuit or the type of the motor to which the present invention is applied.

INDUSTRIAL APPLICABILITY

According to a periodic magnetic field generation device of the present invention, it is possible to further increase or sinusoidalize a generated field by changing a shape of soft magnetic members or shapes of main pole permanent magnets and sub pole permanent magnets, and thus the periodic magnetic field generation device of the present invention can be used in applications for devices using a linear motor or a rotary motor.

The linear motor or the rotary motor according to the present invention can be applied for apparatuses incorporated with semiconductor/liquid crystal devices or electronic components, machine tools, metal working machines, and industrial robots, as its thrust force or torque can be increased.

What is claimed is:

1. A periodic magnetic field generation device comprising:
a field pole of a Halbach array structure in which main pole permanent magnets magnetized in a direction of a generated field and sub pole permanent magnets magnetized in a direction orthogonal to the direction of magnetic poles of the main pole permanent magnets are alternately disposed linearly so as to be adjacent to each other, wherein
a part of each of the main pole permanent magnets on a side on which the magnetic field is generated is replaced by a soft magnetic member,
a relation A<B is established when a length of the soft magnetic member on the side of the generated field along a moving direction of the field is A, and a length of each main pole permanent magnet on a side of a back yoke along the moving direction of the field is B,
both the soft magnetic member and the main pole permanent magnets have a trapezoidal shape, and
the length A of the soft magnetic member on the side of the generated field along the moving direction is equal to a length of each sub pole permanent magnet on a side of the back yoke along the moving direction.

2. The periodic magnetic field generation device according to claim 1, wherein
the relation between the length A of the soft magnetic member on the side of the generated field along the moving direction and the length B of each main pole permanent magnet on the side of the back yoke along the moving direction is $1.5 \leq B/A \leq 3.5$.

3. The periodic magnetic field generation device according to claim 1, wherein
the relation between the length A of the soft magnetic member on the side of the generated field along the moving direction and the length B of each main pole permanent magnet on the side of the back yoke along the moving direction is $2 \leq B/A$, and
a length of the soft magnetic member on the side of the back yoke along the moving direction and a length of each main pole permanent magnet on the side of the generated field along the moving direction of the field are different.

4. The periodic magnetic field generation device according to claim 1, wherein both the sub pole permanent magnets have a trapezoidal shape.

5. A periodic magnetic field generation device comprising:
a field pole of a Halbach array structure in which main pole permanent magnets magnetized in a direction of a generated field and sub pole permanent magnets magnetized in a direction orthogonal to the direction of magnetic poles of the main pole permanent magnets are alternately disposed linearly or circularly so as to be adjacent to each other, wherein a part of each of the main pole permanent magnets on a side on which the magnetic field is generated is replaced by a soft magnetic member, a relation A<B is established when a length of the soft magnetic member on the side of the generated field along a moving direction of the field is A, and a length of each main pole permanent magnet on a side of a back yoke along the moving direction of the field is B, the lengths of the soft magnetic member on the side of the generated field and on the side of the back yoke along the moving direction are identical, and the lengths of each main pole permanent magnet on the side of the generated field and on the side of the back yoke along the moving direction are identical.

6. The periodic magnetic field generation device according to claim 5, wherein each of the sub pole permanent magnets that are adjacent to the main pole permanent magnets is divided into two parts on the side of the generated field, and configured by two permanent magnets magnetized in an oblique direction and a single permanent magnet on the side of the back yoke.

7. The periodic magnetic field generation device according to claim 5, wherein the relation between the length A of the soft magnetic member on the side of the generated field along the moving direction and the length B of each main pole permanent magnet on the side of the back yoke along the moving direction is 2≦B/A, and a length of the soft magnetic member on the side of the back yoke along the moving direction and a length of each main pole permanent magnet on the side of the generated field along the moving direction of the field are different.

8. A linear motor comprising:

a periodic magnetic field generation device provided with a field pole of a Halbach array structure in which main pole permanent magnets magnetized in a direction of a generated field and sub pole permanent magnets magnetized in a direction orthogonal to the direction of magnetic poles of the main pole permanent magnets are alternately disposed linearly so as to be adjacent to each other, wherein a part of each of the main pole permanent magnets on a side on which the magnetic field is generated is replaced by a soft magnetic member, a relation A<B is established when a length of the soft magnetic member on the side of the generated field along a moving direction of the field is A, and a length of each main pole permanent magnet on a side of a back yoke along the moving direction of the field is B, the field pole used in the periodic magnetic field generation device is linear, and armatures are disposed so as to face toward each other with the field pole and a magnetic gap interposed therebetween, both the soft magnetic member and the main pole permanent magnets have a trapezoidal shape, and the length A of the soft magnetic member on the side of the generated field along the moving direction is equal to a length of each sub pole permanent magnet on a side of the back yoke along the moving direction.

9. The linear motor according to claim 8, wherein
both the sub pole permanent magnets have a trapezoidal shape.

10. A rotary motor comprising:

a periodic magnetic field generation device provided with a field pole of a Halbach array structure in which main pole permanent magnets magnetized in a direction of a generated field and sub pole permanent magnets magnetized in a direction orthogonal to the direction of magnetic poles of the main pole permanent magnets are alternately disposed circularly so as to be adjacent to each other, wherein a part of each of the main pole permanent magnets on a side on which the magnetic field is generated is replaced by a soft magnetic member, a relation A<B is established when a length of the soft magnetic member on the side of the generated field along a moving direction of the field is A, and a length of each main pole permanent magnet on a side of a back yoke along the moving direction of the field is B, the field pole used in the periodic magnetic field generation device is circular, and armatures are disposed so as to face toward each other with the field pole and a magnetic gap interposed therebetween, and a central angle with respect to the length A of each soft magnetic member on the side of the generated field along the moving direction is same as a central angle with respect to a length of each sub pole permanent magnet on a side of the back yoke along the moving direction.

11. A linear motor comprising:

a periodic magnetic field generation device provided with a field pole of a Halbach array structure in which main pole permanent magnets magnetized in a direction of a generated field and sub pole permanent magnets magnetized in a direction orthogonal to the direction of magnetic poles of the main pole permanent magnets are alternately disposed linearly so as to be adjacent to each other, wherein a part of each of the main pole permanent magnets on a side on which the magnetic field is generated is replaced by a soft magnetic member, a relation A<B is established when a length of the soft magnetic member on the side of the generated field along a moving direction of the field is A, and a length of each main pole permanent magnet on a side of a back yoke along the moving direction of the field is B, and the field pole used in the periodic magnetic field generation device is linear, and armatures are disposed so as to face toward each other with the field pole and a magnetic gap interposed therebetween, wherein the lengths of the soft magnetic member on the side of the generated field and on the side of the back yoke along the moving direction are identical, and the lengths of each main pole permanent magnet on the side of the generated field and on the side of the back yoke along the moving direction are identical.

* * * * *